[84.]
JOHN P. FLOOM.     Distributor for Seed Drills.
119,023.     Patented Sep. 19, 1871.
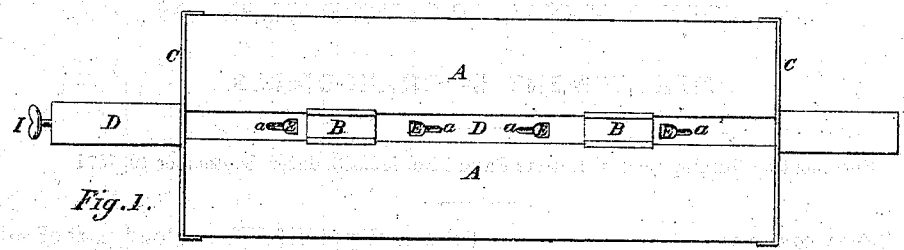
Fig. 1.
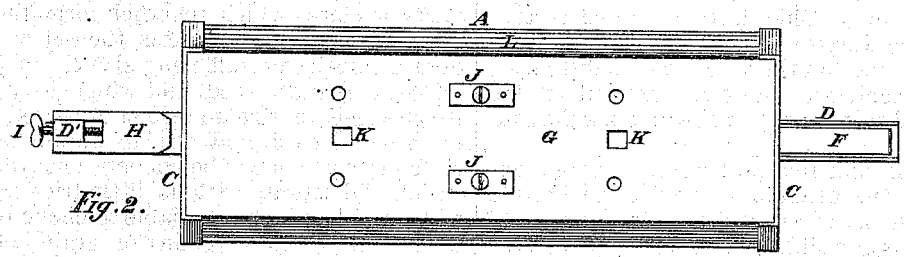
Fig. 2.
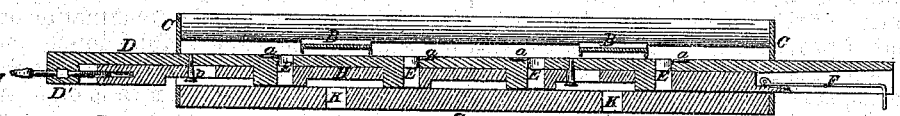
Fig. 3.
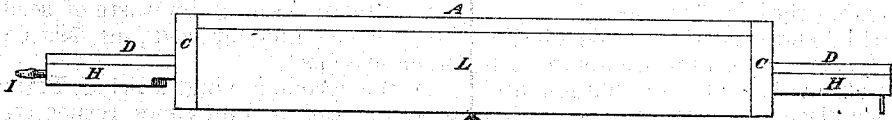
Fig. 4.
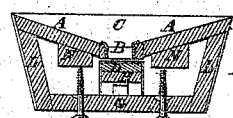
Fig. 5.
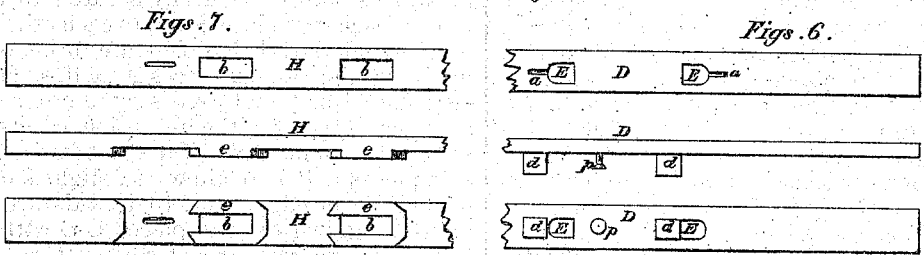
Figs. 7.     Figs. 6.
Witnesses: Ruth K. Abbott, Andrew Choffin
John P. Floom, Inventor
by Job Abbott, Attorney

UNITED STATES PATENT OFFICE.

JOHN P. FLOOM, OF CANTON, OHIO.

IMPROVEMENT IN GRAIN-DRILLS.

Specification forming part of Letters Patent No. 119,023, dated September 19, 1871.

*To all whom it may concern:*

Be it known that I, JOHN P. FLOOM, of Canton, Stark county, Ohio, have invented certain new and useful Improvements in Distributers for Seed-Drills; and that the following is a full, clear, and exact specification thereof, which will enable others skilled in the art to make and use the said invention.

In seed-drill distributers heretofore constructed, in which the attempt was made to imitate the measurement of seed shown in the piston-drill by means of a sliding seed-plate, two serious difficulties have been encountered, the first being that of adjusting the quantity of seed dropped at each vibration of the slide-plate, and the second being that of preventing the slide-plate from clogging and wedging itself fast in working with long grain-seeds, such as the seeds of oats, rye, and barley, or in working with dirty seed of any kind; and my invention relates to certain improvements in a slide-plate distributer with a view of overcoming these difficulties.

The first part of said invention consists in the combination of a two-part sliding seed-plate with a series of cut-off plates and a discharge-plate, said sliding seed-plate being arranged between the cut-off and discharge-plates, and having cavities of sufficient size to contain the amount of seed to be dropped at each vibration, and being so constructed as that the sizes of its seed cavities can be varied by sliding one of its parts upon the other, and the said discharge-plate having simple discharge-holes incapable of adjustment either in size or in position with respect to the cut-off plates or the vibrations of the sliding seed-plate. The particular object of this part of my invention is to adjust the quantity of seed to be dropped by changing the size of the seed-cavity in the sliding seed-plate, instead of changing the size or position of the holes in the discharge-plate, as in former constructions, in order to secure greater accuracy in the amount of seed to be delivered, as the adjustment is here applied directly to the size of the seed-measuring cavity; while in former constructions this cavity was always of the same size, and the adjustment was attempted by changing the size of the holes in the discharge-plate, or their position with respect to the vibrations of the sliding plate; or, in other words, by changing the discharge from he seed-cavity instead of changing the size of the cavity itself. The second part of said invention consists in the novel construction of the two parts or plates which together form the sliding seed-plate of the distributer, the object being to obtain cavities of sufficient size to hold any required amount of seed, and which may be readily changed in size to suit any desired kind or quantity of seed, and also to obtain a form of slide-plate which can be cheaply constructed and which will vibrate with as little friction as possible, and be much less liable to choke or wedge itself fast by drawing dirt or grain between it and the discharge-plate than the ordinary construction of slide-plate. The third part of said invention consists in the combination of tightening-screws with the movable hopper-pieces and bottom or discharge-plate of the distributer, the object being to obtain a means of drawing the edges of the hopper-pieces down onto the slide-plate and of holding the slide-plate down to the discharge-plate, by which the wear of the parts can be taken up and the waste of seed and liability of choking or wedging fast be thereby much lessened.

In the accompanying drawing, Figures 1 and 2 are top and bottom views, respectively, of an apparatus embodying my invention. Fig. 3 is a longitudinal section. Fig. 4 is a side view, and Fig. 5 is a cross-section of the same. Figs. 6 are top, side, and bottom views of the upper part of slide-plate. Figs. 7 are similar views of the lower part.

The side pieces L L and end pieces C C of the apparatus shown are firmly secured to the bottom or discharge-plate G and to each other, and it will be understood that they are to be extended up above the hopper-pieces A A if such extension should be found necessary in order to make a larger hopper for the reception of the grain-seed. The hopper-pieces are so attached to the side-pieces L L as to allow of a slight movement of their lower edges, and their ends are simply abutted against the end pieces C C without being secured thereto, except when desired, by pivot-bolts or screws placed over the side pieces in such a manner as to allow of the movement of their lower edges before referred to. The blocks N N are secured on the under sides and near the lower edges of the hopper-pieces A A, and the tightening-screws J J are run up through holes in the discharge-plate G and screw into the blocks N N, as shown in Fig. 5. The sliding seed-plate D H consists of the upper bar D, in which are made the seed-holes E E at suitable intervals, and on the under side of which are secured the blocks $d$, which are placed at one edge of the holes E, as shown in Figs. 3 and 6, and are of the same width as said holes. The under bar H has the holes $b$ formed in it of the same width as the holes E and blocks $d$, and around the edges of these holes and on the under side of the bar H are formed the flanges $c$, which make with the bar H a thickness equal to the length of the blocks $d$ on the bar D, as shown in Figs. 7. When placed together the bar D fits over the bar H and the blocks $d$ on the bar D fit in the holes $b$ in the bar H, the two bars being held together by screws P P or their equivalents, which pass through slots in one bar, H, and are fastened in the other bar D, as shown in Fig. 3. The adjusting-screw I has a collar which is fitted in the block D′ at the end and on the under side of the bar D, and its end screws into a hole in the end of the bar H, as shown in Fig. 3, by which the bar D may be slid on the bar H in a manner easily seen. The latch F, shown in the drawing, is a part of certain mechanism for vibrating the slide-plate; but as the manner of vibrating the slide-plate forms no essential portion of the herein-described improvements no description of that mechanism is here given, as any known means of vibrating the slide-plate may be used. The slide-plate D H works through slots in the end pieces C C and rests on the flanges $c\ c$, which fit down on the bottom or discharge-plate G, as shown in Figs. 3 and 5, said flanges being underlaid with metal if found desirable. The discharge-holes K K are bored in the plate G, and above the slide-plate D H and directly over each hole K is placed a cut-off plate, B, which is made of metal with a narrow edge or flange at each side, as shown in Fig. 3, and which is secured to the lower edges of the hopper pieces A A.

From this description it will be seen that when the slide-plate is in the position shown in Fig. 3 the seed-cavities E, which are formed by the holes E and $b$ in the bars D and H and the block $d$ on the bar D, will be filled by the seed in the hopper A C A C, and that as the slide-plate is slid along to bring a seed-cavity, E, over a discharge-hole, K, the edge flanges of the cut-off plates B will push off all the grain from the plate D H and will allow only just such an amount of seed as is contained in a cavity, E, to pass under the plate B and be discharged from the hole K; from which it will be evident that the amount of seed discharged at each vibration depends upon the size of the cavity E, and can be adjusted as desired by turning the screw I so as to move the blocks $d$ in the holes $b$ to such a position as will give the part of the hole $b$ between the block $d$ and flange $c$, in connection with the hole E in the bar D, a united capacity equal to the required amount of seed.

It is also seen that, as only the edges of the plates B rest on the plate D H, there is little danger of wedging seeds between these plates, as, if any seeds were to get under the edges of the plates B, they would be at once dragged under the raised central portion of those plates or out into the body of the hopper again; or they would be cut in two parts by the sharp narrow flanges of these plates, and in either case would not impede the vibrations of the slide-plate; and this difficulty is further lessened by the grooves $a$, which are cut in the bar D to receive any such lodged seed.

The flanges $c$ reduce the bearing-surface of the slide-plate D H on the discharge-plate G and prevent the wedging of seed or the cutting of dirt between these plates, as any seeds or dirt are soon worked and pushed out from under the slide-plate by the reciprocating motion of these separate bearings.

When the edges of the pieces A A or B B, or the faces of the slide-plate D H, or the discharge-plate G, become worn, the operator draws down the pieces A A toward the discharge-plate by means of the screws J J, and thus restores the proper fitting of the parts.

The same construction of cut-off plates B, with narrow edges or flanges, may be used in combination with the ordinary form of slide-plate made with one piece having holes bored therein, and will be of advantage in such combination as tending to prevent choking and wedging, as before shown.

What I claim herein as new, and desire to secure by Letters Patent, is—

1. The combination of the two-part slide-plate D H, having the seed-cavities E therein, with the series of cut-off plates B B, and discharge-plate G with holes K K therein, the said slide-plate being so constructed as to admit of a change in the size of all its seed-cavities by the sliding of one of its parts upon the other, and the several parts being arranged and combined substantially as and for the purpose herein specified.

2. The cut-off plate B, provided with a narrow turned-down edge or flange, as shown, in combination with the vibrating slide-plate D H with seed cavity E therein, whether said slide-plate be made in one or more parts, substantially as and for the purpose herein specified.

3. The herein-described slide-plate D H, consisting of the bar D with holes E E, head-block D′, and cavity-blocks $d$, the bar H with holes $b\ b$ and underlying flanges $c\ c$, and the adjusting-screw I, the several parts being constructed, combined, and arranged substantially as and for the purpose herein specified.

4. The combination of the discharge-plate G, tightening-screws J J, screw-blocks N N, and movable hopper-pieces A A, the several parts being arranged so as to draw the lower edges of the hopper-pieces toward the discharge-plate by turning up the tightening-screws, substantially as and for the purpose specified.

As evidence of the foregoing, witness my hand this 10th day of February, A. D. 1871.

JOHN P. FLOOM.

Witnesses:
  JOB ABBOTT,
  ANDREW CHOFFIN. (84.)